United States Patent
Takahashi et al.

(10) Patent No.: US 7,589,436 B2
(45) Date of Patent: Sep. 15, 2009

(54) DATA PROCESSING UNIT AND DC BACKUP POWER SUPPLY

(75) Inventors: Fumikazu Takahashi, Tokyo (JP);
Akihiko Kanouda, Tokyo (JP);
Masahiro Hamaogi, Kanagawa (JP);
Yoshihide Takahashi, Kanagawa (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 298 days.

(21) Appl. No.: 11/052,097

(22) Filed: Feb. 8, 2005

(65) Prior Publication Data

US 2006/0056142 A1 Mar. 16, 2006

(30) Foreign Application Priority Data

Sep. 10, 2004 (JP) ............................. 2004-263555

(51) Int. Cl.
*H02J 7/00* (2006.01)
*H02J 9/00* (2006.01)

(52) U.S. Cl. ............................. 307/66; 307/43; 307/52; 307/64; 307/65; 307/85; 307/112; 307/116; 307/125

(58) Field of Classification Search .................. 307/43, 307/52, 64–66, 85, 112, 116, 125, 150
See application file for complete search history.

(56) References Cited

U.S. PATENT DOCUMENTS

| | | | | |
|---|---|---|---|---|
| 4,774,631 A | * | 9/1988 | Okuyama et al. | 361/695 |
| 5,237,484 A | * | 8/1993 | Ferchau et al. | 361/689 |
| 5,938,407 A | * | 8/1999 | Garrett | 417/16 |
| 6,121,695 A | * | 9/2000 | Loh | 307/64 |
| 6,310,783 B1 | * | 10/2001 | Winch et al. | 361/797 |
| 6,579,168 B1 | * | 6/2003 | Webster et al. | 454/184 |
| 6,746,790 B2 | * | 6/2004 | Colborn | 429/26 |
| 6,877,551 B2 | * | 4/2005 | Stoller | 165/47 |
| 6,889,752 B2 | * | 5/2005 | Stoller | 165/47 |
| 6,904,541 B1 | * | 6/2005 | MacArthur et al. | 714/14 |
| 6,998,821 B2 | * | 2/2006 | Sakai et al. | 320/138 |
| 7,061,715 B2 | * | 6/2006 | Miyamoto et al. | 360/97.03 |
| 2002/0173265 A1 | * | 11/2002 | Kipka et al. | 454/184 |
| 2003/0222618 A1 | * | 12/2003 | Kanouda et al. | 320/116 |
| 2003/0223196 A1 | * | 12/2003 | Smith et al. | 361/687 |
| 2005/0024825 A1 | * | 2/2005 | Smith et al. | 361/687 |
| 2005/0034468 A1 | | 2/2005 | Dietz et al. | |
| 2005/0099750 A1 | * | 5/2005 | Takahashi et al. | 361/92 |
| 2005/0112456 A1 | * | 5/2005 | Kozu et al. | 429/62 |
| 2005/0162836 A1 | * | 7/2005 | Briggs et al. | 361/724 |
| 2006/0176664 A1 | * | 8/2006 | Casebolt | 361/687 |

FOREIGN PATENT DOCUMENTS

JP 2003-309935 10/2003

* cited by examiner

*Primary Examiner*—Stephen W Jackson
*Assistant Examiner*—Adi Amrany
(74) *Attorney, Agent, or Firm*—Crowell & Moring LLP

(57) ABSTRACT

A backup power supply is so constructed that it is provided with multiple DC backup power supplies 111 to 11N, each containing nickel-metal hydride battery, stored upright on the bottom of the disk array unit 100; cooled by cooling air through the vents 1011 for ventilation from the bottom to the top; and connected with the output of the AC/DC converters 121, 122 with the backboard 151.

Very compact disk array unit with an uninterruptible power supplying function can be realized.

10 Claims, 10 Drawing Sheets

OBLIQUE REAR VIEW OF DC BACKUP POWER SUPPLY 111

DATA PROCESSING UNIT AND DC BACKUP POWER SUPPLY

CLAIM OF PRIORITY

The present application claims priority from Japanese application serial no. 2004-263555, filed on Sep. 10, 2004, the content of which is hereby incorporated by reference into this application.

FIELD OF THE INVENTION

The present invention relates to a data processing unit such as disk array unit equipped with DC backup power supply and to a DC backup power supply that backs up the power supply to loads by means of various types of secondary battery such as nickel-metal hydride battery or lithium battery.

BACKGROUND OF THE INVENTION

A data processing unit such as disk array unit used as an external memory of a computer is equipped with a UPS (uninterruptible power supply) against power failure or auxiliary energy source such as storage battery that backs up important loads such as cash memory.

Lately, a DC type UPS that supplies DC power to loads in case of power failure such as momentary stoppage or interruption of commercial power, that is, DC backup power supply has drawn attention. A known art on rack-mount type DC backup power supply includes one disclosed in Japanese Patent Laid-open No. 2003-309935. This document discloses an art for making slim (thinning) a DC backup power supply and installing it flat within a height (about 45 mm) of one unit size of the rack.

SUMMARY OF THE INVENTION

The DC backup power supply in the above document employs nickel-metal hydride battery having high energy density so as to reduce the volume tremendously and accordingly enable a disk array unit to be mounted in a data processing unit rack. However, since nickel-metal hydride battery has higher discharge capacity per unit time than conventional lead storage battery, heat radiation design of the DC backup power supply is difficult. According to the above document, for the above reason, fan is mounted in the DC backup power supply for cooling the secondary battery and components on the electric circuit, but the mounting space becomes greater accordingly. In particular, as the capacity of disk array (data processing) unit becomes greater, heat radiation measures becomes more and more difficult and hence making a unit compact becomes more difficult and cost increases.

An object of the present invention is to offer a compact and economical data processing unit such as disk array unit.

Another object of the present invention is to offer a compact and economical DC backup power supply.

In an aspect of the invention, for a data processing unit that stores a DC backup power supply in the bottom section of its rack and hard disk drive and others at higher sections, the primary fan for ventilation from the bottom to the top is mounted in a higher storage section and also vents are provided in the partition of the rack closest to the bottom storage section storing the DC backup power supply.

In another aspect of the invention, a rectangular parallelepiped battery pack containing multiple secondary batteries is provided in the secondary battery section of the DC backup power supply and the battery pack is mounted upright so that the shortest sides of the rectangular parallelepiped are positioned at the top and bottom. It is desirous to employ nickel-metal hydride secondary battery having high energy density as the secondary battery.

In another aspect of the invention, vents are provided in the top surface and bottom surface of a DC backup power supply case storing the secondary battery section and charging/discharging control section.

In another aspect of the invention, a connector is provided on the rear of the DC backup power supply so that, when the DC backup power supply is mounted into the rack of the data processing unit, the DC backup power supply is connected with the backed-up system of the data processing unit by a backboard.

In a preferred embodiment of the present invention, an AC/DC converter equipped with a secondary fan on its bottom is mounted above the DC backup power supply and the DC backup power supply is cooled by the primary and secondary fans under a normal condition but the DC backup power supply is cooled only by the primary fan in case of power failure.

According to a preferred embodiment of the present invention, a compact and economical data processing unit such as disk array unit can be realized.

According to another preferred embodiment of the present invention, a compact and economic DC backup power supply can be realized.

Other objects and features of the present invention are described hereunder along with preferred embodiments.

DESCRIPTION OF THE PREFERRED EMBODIMENTS

Figure 1:
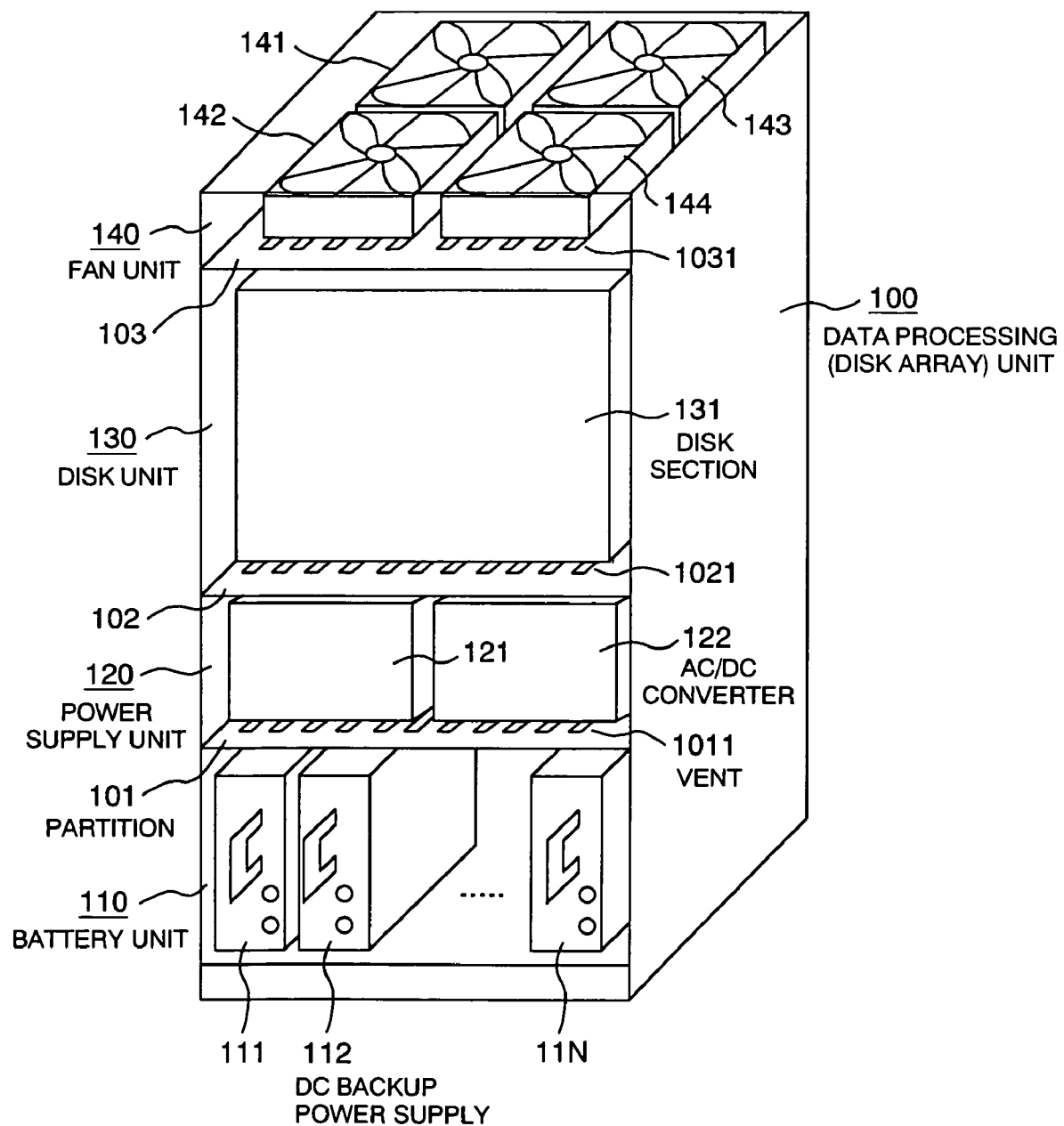
FIG. 1 shows an oblique view of the brief construction of a data processing unit according to the first embodiment of the present invention.

FIG. 1 is an oblique view of the brief construction of a disk array unit as an example of the data processing unit equipped with a DC backup power supply (hereinafter called the backup power supply) according to the first embodiment of the present invention. The disk array unit 100 having a rack structure is separated vertically into multiple-storied storage spaces by multiple partitions 101, 102, 103. In this embodiment, there are four stories of storage spaces, each for battery unit 110, power supply unit 120, disk unit 130, and fan unit 140 from the bottom to the top in this order. In the battery unit 110 on the bottom, N sets of DC backup power supplies 111, 112, up to 11N are mounted. In the power supply unit in the storage space right above it, two AC/DC converters 121, 122 are mounted. In the disk unit 130 right above it, a disk section 131 comprising multiple hard disk drives (HDDs) and controllers is mounted. In the fan unit 140 at the top storage space, four fans 141 to 144 are mounted.

In this disk array (data processing) unit 100, the number of HDDs and controllers contained in the disk section 131 and fans contained in the fan section 140 can be increased as needed up to the storage space limit of the rack in use.

The number N of the backup power supplies 111 to 11N can be increased or decreased depending upon the capacity necessary for the backed-up electric devices in the disk unit 130 and fan unit 140 which are load to the power supply. The capacity per unit of the backup power supplies 111 to 11N shall preferably be designed at a load capacity in the minimum system configuration, that is, so as to be able to back up a system configuration where the load capacity is the minimum. As the load capacity increases, the number N of the backup power supplies shall be increased accordingly. The space of the battery unit 110 is designed capable of storing the number N of the backup power supplies 111 to 11N so as to be sufficient for a load capacity in the maximum system configuration, that is, so as to be able to back up a system configuration where the load capacity is the maximum. In addition, the backup power supplies are mounted upright in the battery unit 110, detail of which will be described later.

The power supply unit 120 containing two AC/DC converters 121, 122 is shown in the figure but two are not always needed. When AC/DC converter is duplicated for enhancing the reliability or when the capacity of the converter needs to be increased because of increased load capacity, a necessary number of converters are mounted in the power supply unit 120.

Multiple fans 141 to 144 mounted in the fan unit 140 sucks the heat generated from the components mounted in the above each unit and exhausts towards the top of the unit, preventing the temperature increase of each component. Although the fan unit 140 is mounted at the very top of the rack in this embodiment, fan units can be mounted at multiple positions inside the disk array unit. It is preferable to mount the fan units at various positions, for example, between the power supply unit 120 and disk unit 130 or in the middle of the disk unit 130, so as to increase the cooling effect for each component.

Vents 1011 to 1031 are provided in the partitions 101 to 103 separating the rack vertically. In many cases according to a prior art, the battery unit 110 is thermally isolated from the power supply unit 120 and disk unit 130 mounted above. In this embodiment, however, vents 1011 are provided in the partition 101 so as to positively utilize the ventilation by the fan unit 140 mounted above to cool the secondary battery and relevant components in the battery unit 110. For this purpose, each backup power supply 111 to 11N is mounted upright. That is, as shown in FIG. 1, each backup power supply 111 to 11N is formed in a rectangular parallelepiped and mounted upright and side by side so that the shortest sides of the rectangular parallelepiped are positioned at the top and bottom. Accordingly, the backup power supplies 111 to 11N are effectively cooled by the ventilation from the very bottom up to the vents 1011 of the partition 101 through each rectangular-parallelepiped backup power supply 111 to 11N.

Figure 2:
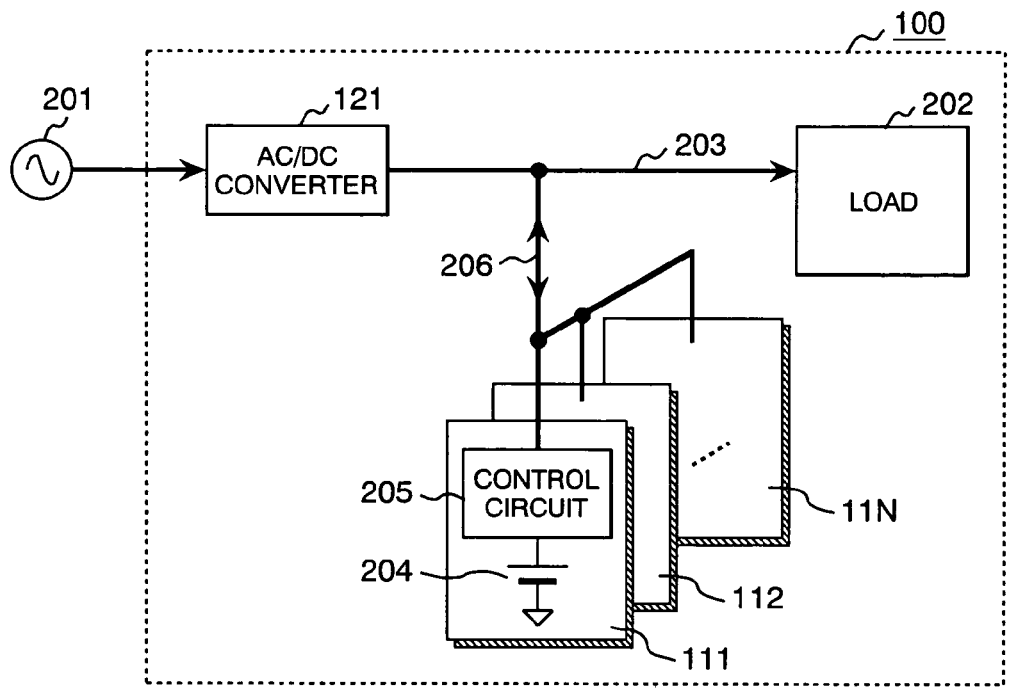
FIG. 2 is a block diagram of an example electric circuit of a data processing unit to which the present invention can apply.

FIG. 2 is a block diagram of an example electric circuit in a data processing unit 100 to which the present invention can apply. Alternating current from a commercial AC power supply 201 is converted into direct current by the AC/DC converter 121 and then supplied to load 202, which typically includes a disk section 131 and fans 141 and 144 in the data processing unit 100, through a power line 203. Each backup power supply 111 to 11N comprises nickel-metal hydride battery 204 and control circuit 205 for the charging/discharging control of the battery, and its input/output line 206 is connected with the DC power line 203 which is the output of the AC/DC converter 121. When the commercial power source 201 is alive, the control circuit 205 can control the charging of the secondary battery 204 through the AC/DC converter 121, DC power line 203 and input/output line 206 of the backup power supply, corresponding to the residual capacity of the battery. When the commercial power source 201 has failed, the DC power line 203 is backed up by the secondary battery 204 through the control circuit 205 and input/output line 206 and power can be supplied to the load 202. Applicable secondary battery 204 may be not only nickel-metal hydride battery but other secondary batteries including lithium battery and fuel cell or electric double-layer capacitor.

Figure 3:
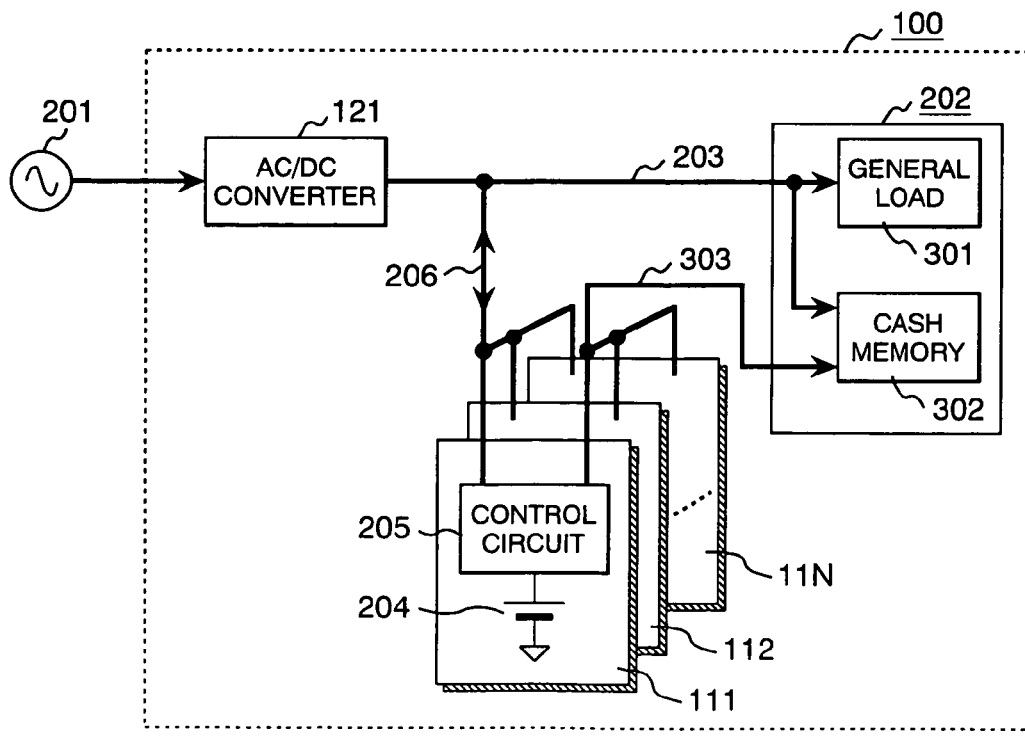
FIG. 3 is a block diagram of another electric circuit of a data processing unit to which the present invention can apply.

FIG. 3 is a block diagram of another electric circuit of a data processing unit to which the present invention can apply, in which specific important load including cash memory are to be backed up for a long time. In addition to the input/output line 206 for backing up the DC power line 203 for the whole load 202 including general load 301 and specific load 302, there is provided a dedicated backup output line 303 for the specific load 302. While general load 301 includes HDDs, fans, and others, specific load 302 includes cash memory for example. The nickel-metal hydride battery 204 is designed to allow for the backup capacity of the cash memory 302. Upon a power failure, the control circuit 205 backs up the DC power line 203 from the input/output line 206 and supplies power to the whole load 202 in the beginning and, after a specified time has elapsed, stops outputting to the input/output line 206 and supplies power only to the cash memory 302 from the output line 303 dedicated for the specific load. The backup time of the cash memory 302 is much longer than the backup time of the whole load 202, and it is 10 to 40 hours in reality. When the backup power supplies 111 to 11N is provided with the backup output line 303 dedicated for the specific load, the size of the backup power supply becomes larger as the battery capacity increases, and consequently wiring to the specific load 302 slightly increases. A mounting plan of the disk array unit, however, will not change.

Figure 4:
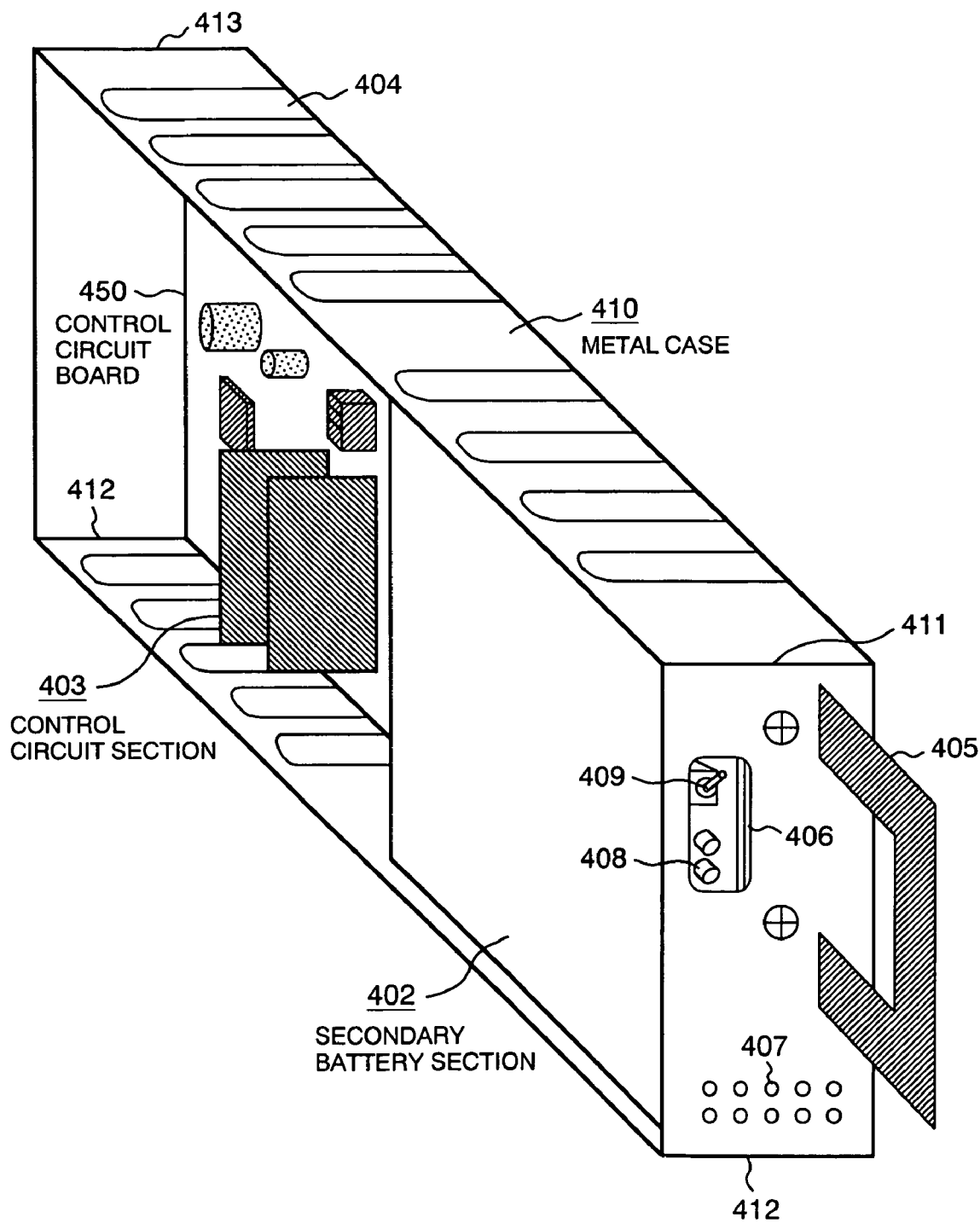
FIG. 4 shows an oblique front view of the mounted backup power supply according to the first embodiment of the present invention.
Figure 5:
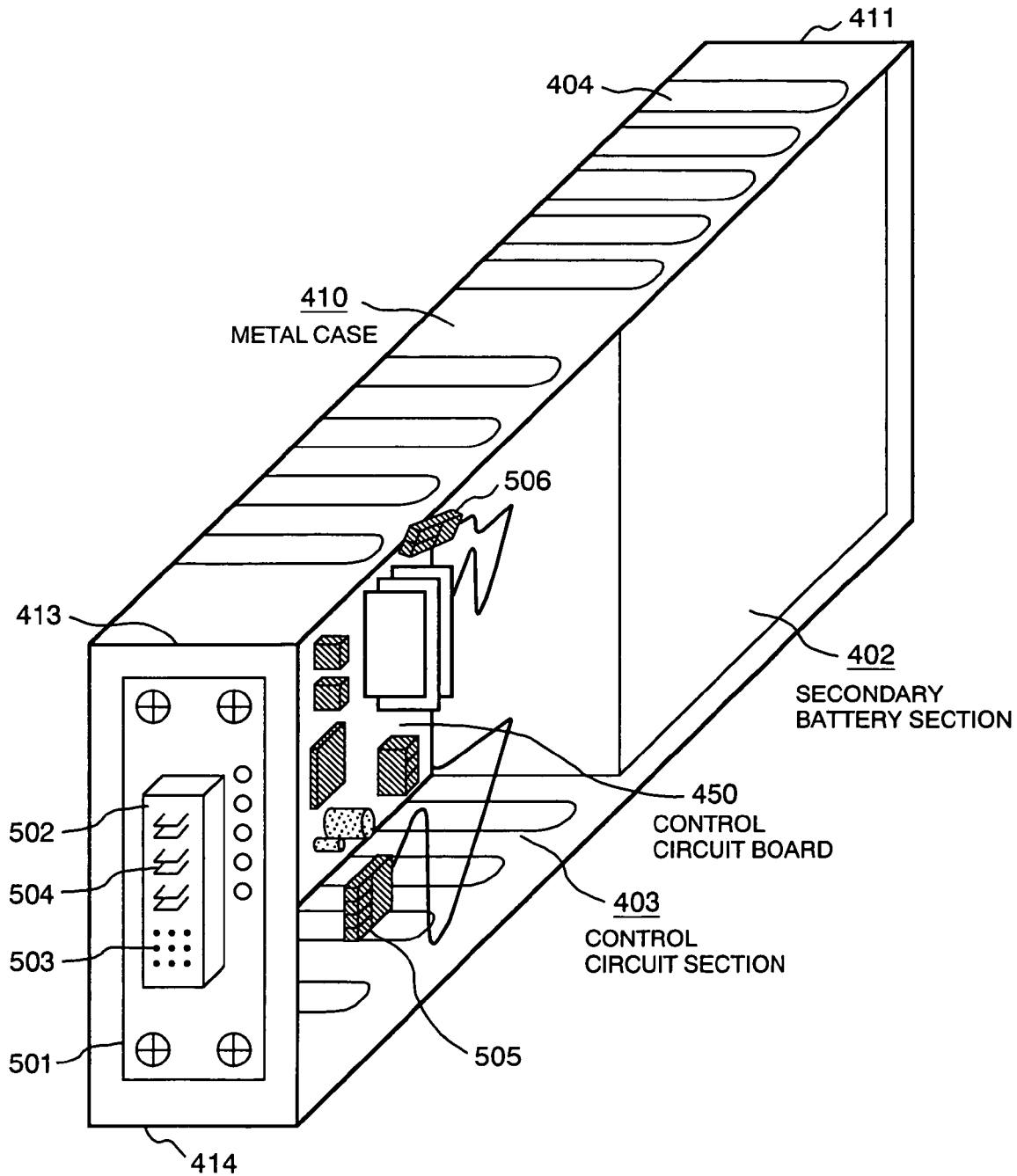
FIG. 5 shows an oblique rear view of the mounted backup power supply according to the first embodiment of the present invention.

FIG. 4 and FIG. 5 are oblique views of a mounted image of the backup power supply according to the first embodiment of the present invention: FIG. 4 is an oblique view from the front and FIG. 5 is an oblique view from the rear. The backup power supply 111 comprises the secondary battery section 402 and control circuit 403 built in a metal case 401. The secondary battery section 402 consists of a battery pack containing multiple nickel-metal hydride batteries connected in series and the control circuit section 403 is an electric component for the charging/discharging control of the secondary battery. The metal case 410 is a rectangular parallelepiped case and is mounted upright so that the four shortest sides 411 to 414 of the rectangular parallelepiped are positioned at the top and bottom as explained in FIG. 1 and shown in FIGS. 4 and 5. A number of slits (vents) 404 for ventilation are provided in both top and bottom surfaces so as to ensure the ventilation from the bottom to the top. The secondary battery section 402 consists of multiple nickel-metal hydride battery cells piled upright, of which detail will be described later, forming a rectangular parallelepiped battery pack 402 as shown. The rectangular parallelepiped battery pack 402 is also mounted upright.

In the control section 403, on the other hand, a control circuit board 450 is mounted nearly upright inside the metal case 410 and components including power devices, resistors, capacitors, CPU and various ICs are mounted on the board. It is understood that the above construction enables both the secondary battery section 402 and control circuit section 403 to be effectively cooled by the vertical ventilation. Accordingly, because of the number of slits 404 provided in the top and bottom surfaces of the case 410 of the backup power supply 111, effective cooling of the power related components in the control circuit section 403 as well as battery section 402 is realized. Thus, the backup power supply 111 to 11N in the battery unit 110 in FIG. 1 needs no cooling fan and hence reduced mounting area and reduced cost can be realized.

On the front of the backup power supply 111, there are provided a handle 405 used for mounting and demounting the backup power supply 111 into/from the rack, window 406, and vents 407. Indication LEDs (Light Emitting Diodes) 408 are visible through the window 406, informing the backup power supply condition to the outside. That is, various types of information including the normal or abnormal condition, charging or discharging condition, and battery life of the backup power supply 111 can be informed to the outside using the lighting and flickering patterns of the LEDs 408. In addition, the ON/OFF switch 409 can be operated from the outside.

A connector 502 is mounted on an interface board 501 on the rear of the backup power supply 111. This connector 502 is for the connection with necessary power lines and signal lines of the disk unit 130 and power supply unit 120 of the disk array (data processing) unit 100. Firstly, for the power lines, the DC power line 203 as the output of the AC/DC converter 121 and the backup line 303 dedicated for the specific load are connected. Next, the signal line with the control circuit section 403 (205 in FIGS. 2 and 3) and a controller (not shown) in the disk unit 130 is connected. The signal line connector 503 and power line connector 504 are shown in the figure.

The secondary battery section 402 and control circuit section 403 are connected as the power line connector 505 outgoing from the battery section 402 and the connector 506 for sensing signals on the temperature and voltage of the battery cell are connected with the corresponding connectors on the control circuit board 450.

Figure 6:
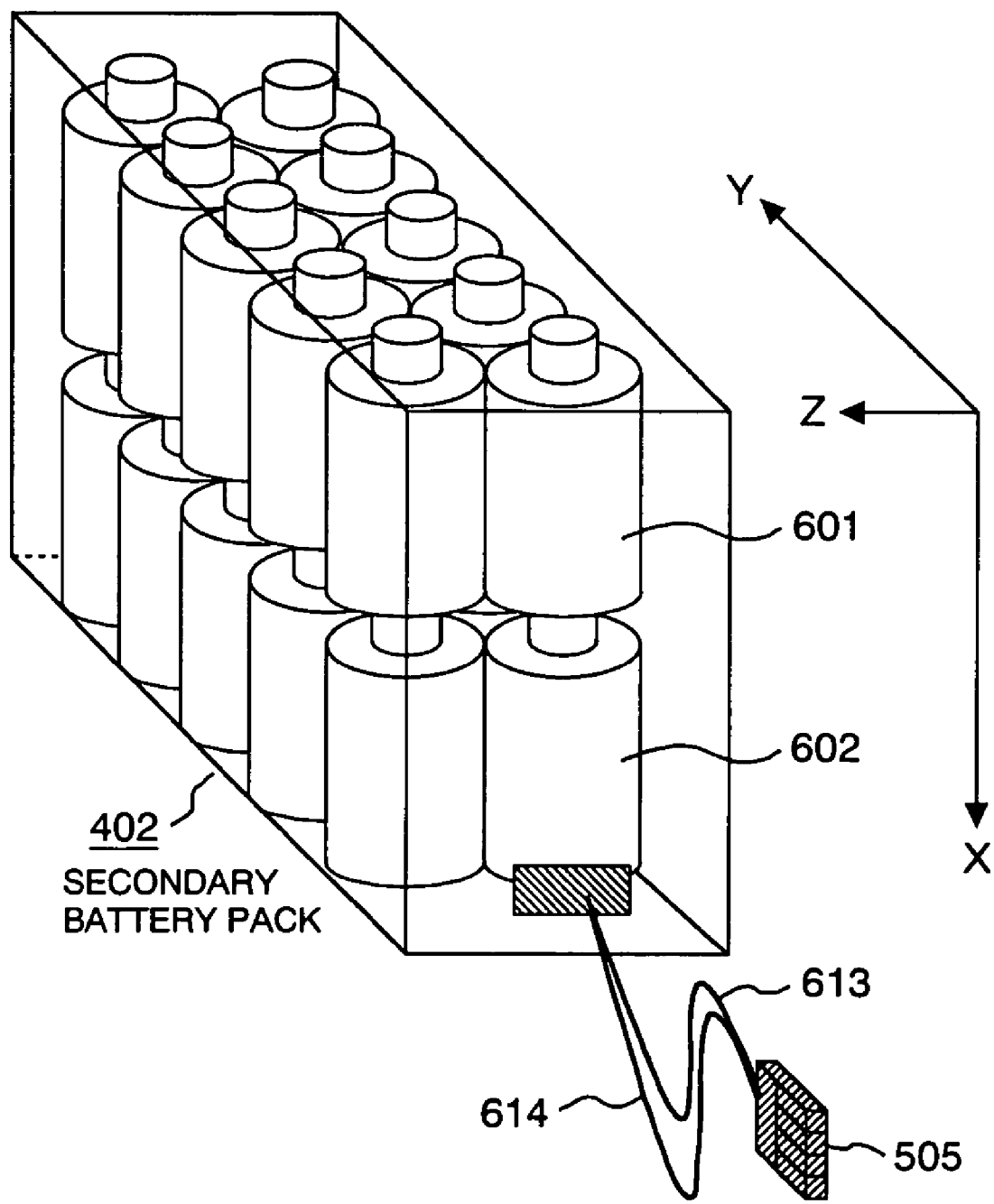
FIG. 6 shows a mounting image of nickel-metal hydride battery cells into the secondary battery section (battery pack) in the DC backup power supply according to the first embodiment of the present invention.

FIG. 6 shows a mounting image of nickel-metal hydride battery cells into the secondary battery section (battery pack) in the DC backup power supply according to the first embodiment of the present invention. Two battery cells 601 and 602 are mounted in series and a battery pack consists of a number of these series-connected cells installed side by side. Electric poles of the battery cells are connected by metal plate or cable inside the battery pack and the positive pole cable 613 and negative pole cable 614 are drawn out of the pack 402. This design enables to achieve series or parallel connection of any required number of battery cells. As described in FIG. 5, the power line connector 505 is for the connection of the positive pole and negative pole cables with the control circuit section 403.

The battery pack 402 is so mounted in the backup power supply 111 to 11N that the X axis in the figure is oriented in the vertical direction, Y axis is oriented in the width direction, and Z axis is oriented in the depth direction. Consequently, a battery pack 402 having an outline image as shown, relatively narrow width with some height and long depth, can be formed, resulting in a construction that can effectively cooled by the vertical ventilation.

FIG. 6 shows a case where two battery cells are connected each, but the number can be varied flexibly depending upon the size of battery cells, necessary backup capacity, and/or mounting limitation of the backup power supply. In addition, although the figure shows a case where the positive electrodes of all the battery cells are oriented upwards, the orientation can be changed as needed. Furthermore, although the figure shows the battery cells are mounted in two rows in the width direction, it is needless to say that the number can be varied as needed depending upon the mounting efficiency and cooling performance.

Figure 7:
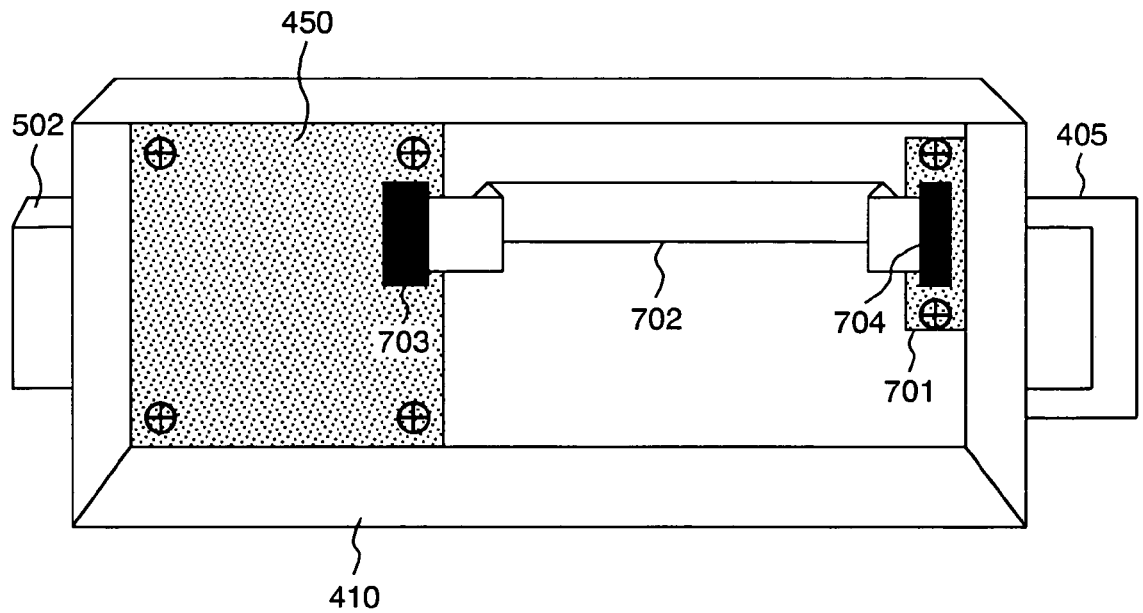
FIG. 7 shows a side view of the backup power supply excluding the battery section according to the first embodiment of the present invention.

FIG. 7 is a side view of the backup power supply excluding the battery section according to the first embodiment of the present invention. The board 450 of the control circuit section 403 and external interface board 701 for mounting indication LEDs and ON/OFF switch are shown without those components. The external interface board 701 on the front provided with the handle 405 is connected with the control circuit section board 450 on the rear provided with the connector 502 by the flat cable 702 and connectors 703 and 704. An LED control signal is sent from the CPU mounted on the control circuit section board 450 to the external interface board 701 via the flat cable 702 and, on the contrary, an ON/OFF signal of the ON/OFF switch is sent from the external interface board 701 to the control circuit section board 450.

By connecting the two boards using the flat cable 702 laid alongside the battery section 402, wiring space can be made nearly zero, thereby contributing to make the backup power supply 111 to 11N more compact.

Figure 8:
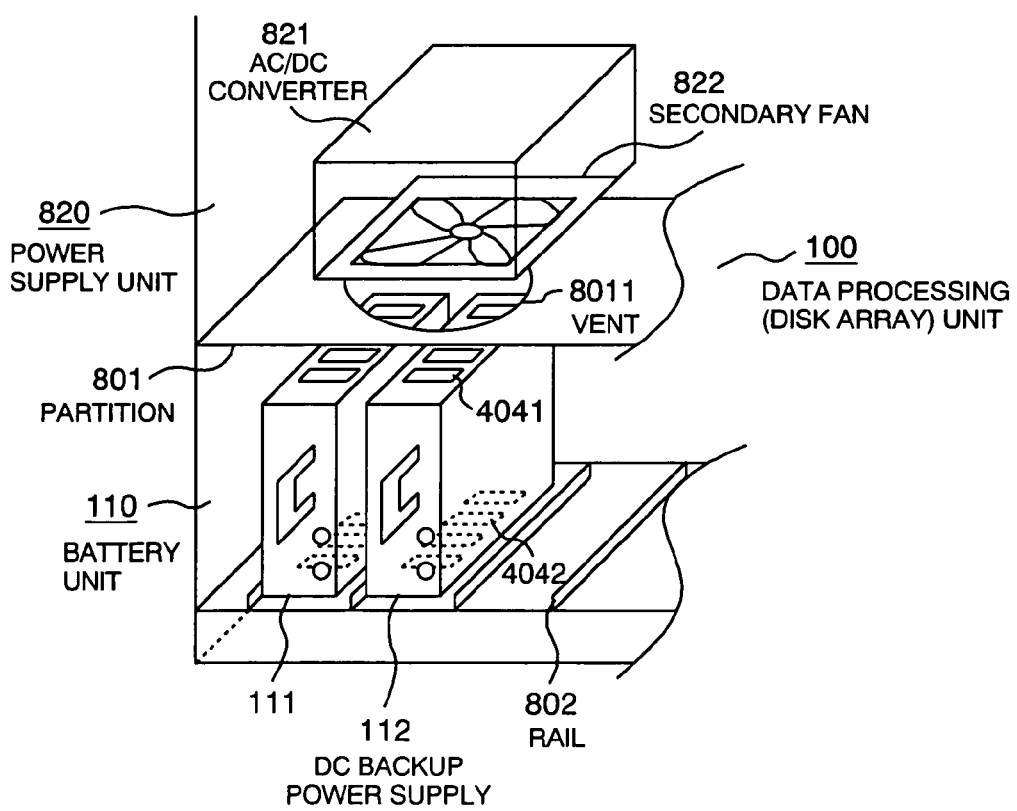
FIG. 8 shows an oblique view of the brief construction of part of a data processing unit according to the second embodiment of the present invention.

FIG. 8 is an oblique view of the brief construction of part of a disk array unit as the data processing unit equipped with the backup power supply according to the second embodiment of the present invention. The same symbol as in FIG. 1 represents the same part/component and so no duplicate description is given. The figure shows a brief construction of the battery unit 110 and power supply unit 820 of the disk array unit 100. The cooling system of the unit is based on bottom suction and top exhaust, where a secondary fan 822 is mounted as well in the AC/DC converter 821 and the power semiconductor devices inside the converter 821 are cooled by the ventilation from the bottom to the top by this fan 822. A sufficient size of an opening 8011 is provided in the partition between the battery unit 110 and power supply unit 820 so that the backup power supplies 111, 112, etc. can be cooled by the fan 822. Rows of storage rails 802 are provide on the bottom of the battery unit 110 so that multiple backup power supplies 111, 112, etc. can be stored and mounted upright along the rails. A number of slits 4041 and 4042 are provided on the top and bottom surfaces of these backup power supplies 111, 112, etc. so that the cooling air by the fan 822 can smoothly pass through the battery section 402 and control circuit section 403 inside the backup power supplies 111, 112, etc. In addition, a suction space is maintained between the bottom of the battery unit 110 and the bottom slits 4042 of the backup power supplies 111, 112, etc. With this construction, an upward ventilation path from the bottom end of the rack 100 through the both slits 4041 and 4042 of the backup power supplies 111, 112, etc. is formed by the fan 822 and the batteries and control circuits in the backup power supply can be cooled effectively.

Figure 9:
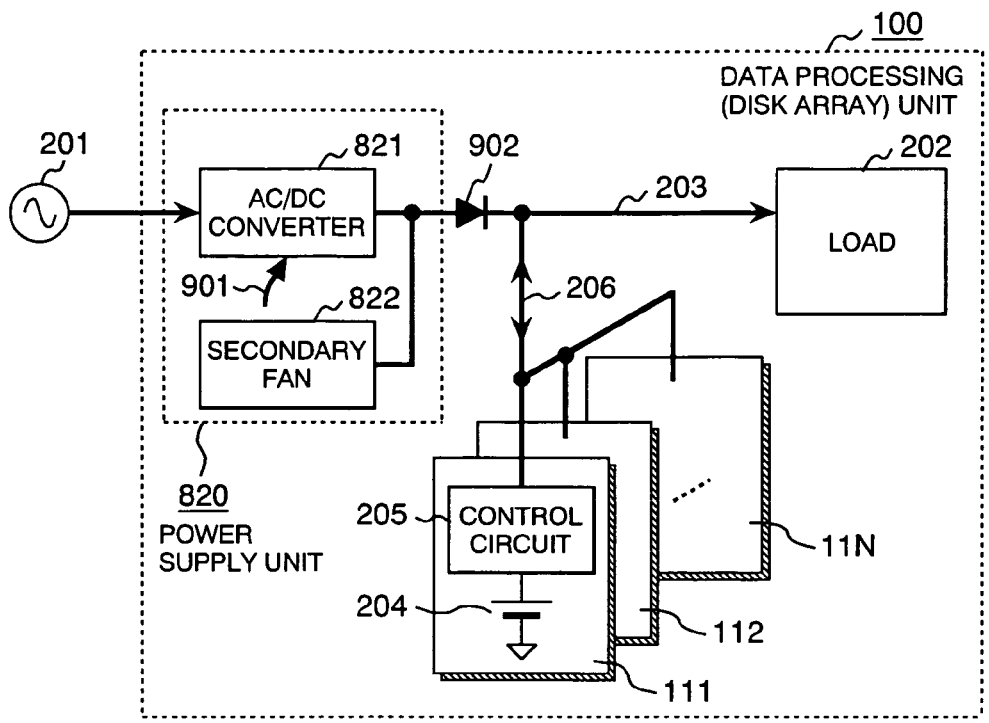
FIG. 9 is a block diagram of an electric circuit of a data processing unit of the embodiment in FIG. 8.

FIG. 9 is a block diagram of an example electric circuit of a data processing unit to which the embodiment in FIG. 8 can apply. The same symbol as in FIG. 2 represents the same part/component and no duplicate description is given. The power supply unit 820 is connected with a secondary fan 822 to which the output of the AC/DC converter is supplied directly. The ventilation air from the bottom to the top by the fan 822 cools the power semiconductor devices in the converter 821. Upon a power failure, the AC/DC converter 821 is interrupted but cannot receive the backup from the backup power supplies 111 to 11N because of a reaction of a reverse-current preventing diode 902, and so the fan 822 mounted in the converter ceases to operate. Since, however, the primary fans 141 to 144 mounted far above the power supply unit 820 are backed up by the backup power supplies 111 to 11N as explained above, cooling of the backup power supply is maintained although from a distance. Accordingly, the backup power supplies 111 to 11N in the battery unit 110 does not require dedicated fan, thereby enabling to reduce space and cost.

The embodiments described above can be summarized as follows. They relate to a data processing unit 100 such as disk array unit having a rack structure which is separated vertically into multiple storage sections 110 to 140 by partitions 101 to 103. The data processing unit 100 has a battery unit 110 containing DC backup power supplies 111 to 11N, each comprising a secondary battery section 402 and charging/discharging section 403, on the bottom of the rack. A disk unit 130 comprising hard disk drives and others is stored above the battery unit 110. In this construction, primary fans 141 to 144 for ventilation from the bottom to the top of the rack are mounted above the disk unit 130. AC/DC converters 121, 122 together with a secondary fan 822 for ventilation from the bottom to the top are mounted in the storage section 120 right above the battery unit 110. Vents 1011 are provided in the partition 101 between the battery unit 110 and AC/DC converters 121, 122. Multiple DC backup power supplies 111 to 11N, each forming an independent rectangular parallelepiped case 410, are mounted in the battery unit 110 and a battery pack 402 containing multiple nickel-metal hydride secondary batteries 601 to 606 is mounted in the case. The rectangular parallelepiped case 410 is mounted upright so that the shortest sides 411 to 414 of the rectangular parallelepiped are positioned at the top and bottom and vents 404 are provided in its top and bottom surfaces.

With the above construction, without providing any cooling fan for the DC backup power supplies 111 to 11N, the DC backup power supply can be effectively cooled by utilizing upper fans, and hence a compact and economic data processing unit can be realized.

Figure 10:
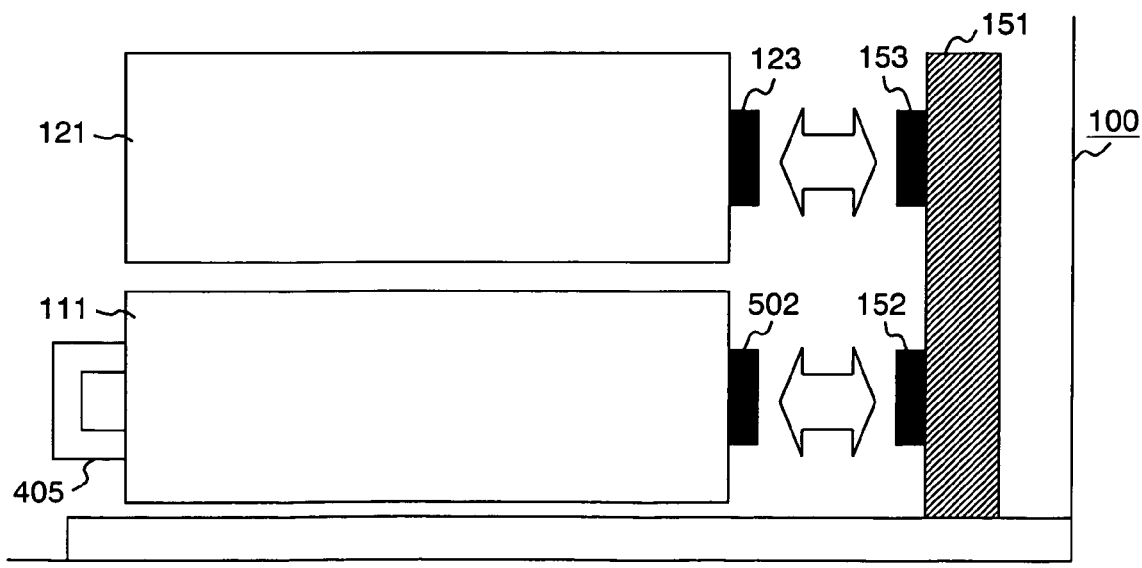
FIG. 10 shows a side view of a connection image between the backup power supply and AC/DC converter according to the first embodiment of the present invention.

FIG. 10 is a side view of a connection image between the backup power supply and AC/DC converter according to the first embodiment of the present invention. The backup power supply 111 in the battery unit 110 of the disk array unit 100 and the AC/DC converter 121 in the power supply unit 120 are focused and a connection image in a side view is shown on an assumption that the two units have nearly the same depth. The biggest point of this embodiment is that the two units can be connected by the backboard 151. The connector 502 provided on the rear of the backup power supply 111 and the connector 123 provided on the rear of the AC/DC converter 121 are connected with connectors 152 and 153 provided on the backboard 151, respectively. This construction enables to eliminate wiring cable, and hence space saving can be realized. In addition, erroneous connection which is likely to happen in using multiple connector cables for signal line and power line can be prevented, and hence reliability can be improved.

Figure 11:
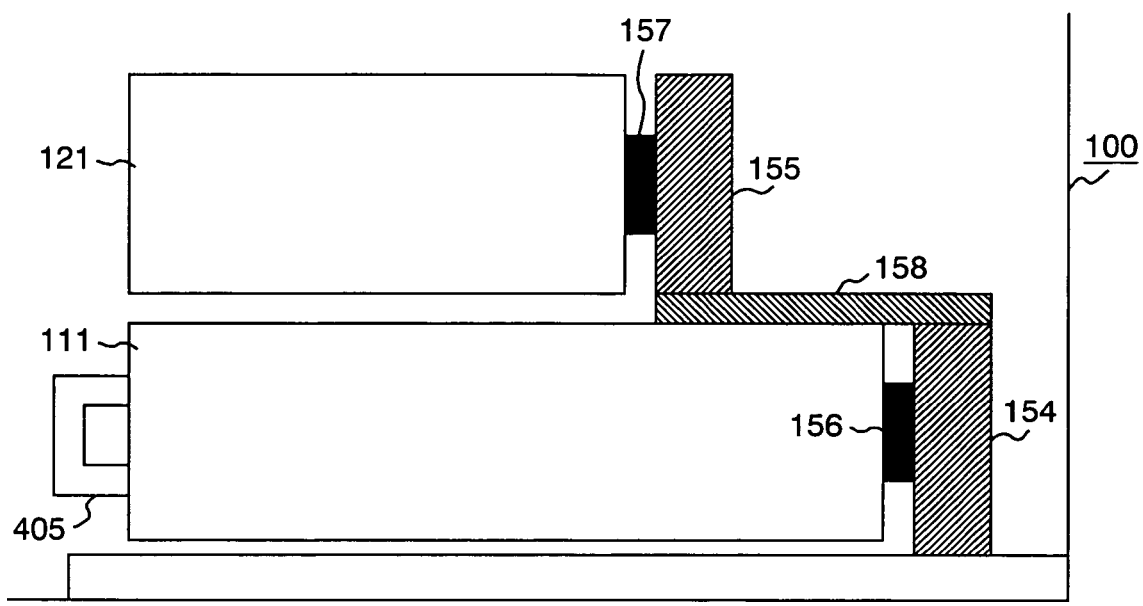
FIG. 11 shows a side view of a connection image between the backup power supply and AC/DC converter according to another embodiment of the present invention.

FIG. 11 is a side view of a connection image between the backup power supply and AC/DC converter according to another embodiment of the present invention. The construction is basically the same as in FIG. 10 except that the backup power supply 111 and AC/DC converter 121 differ in the length. The figure shows a case where the backup battery supply 111 is longer than the AC/DC converter 121. In this case, each unit has its own backboard 154 and 155 and is connected with it by each connector 156 and 157, respectively and common power lines of the two units are connected by a metal plate 158. With this construction, the same effect including space saving and reliability improvement as in the previous embodiment can be expected.

Figure 12:
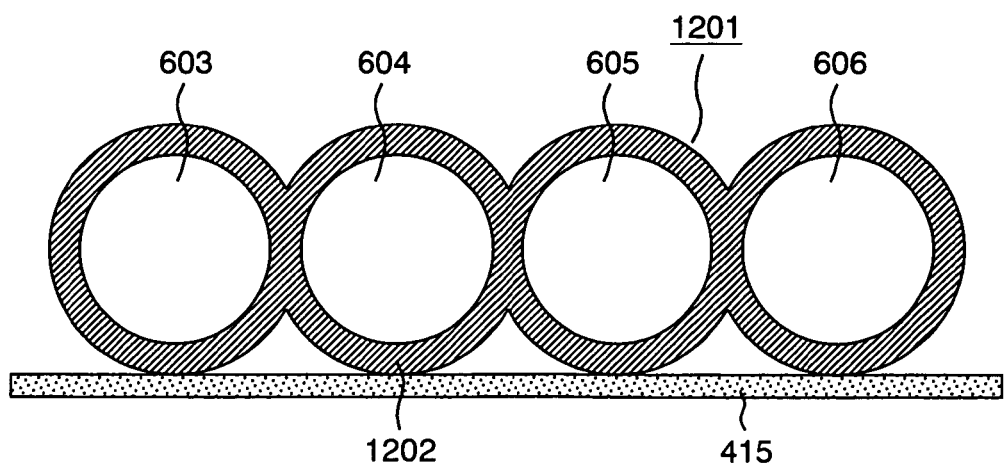
FIG. 12 shows a horizontal cross-sectional view of another embodiment of the secondary battery pack according to the present invention.
Figure 13:
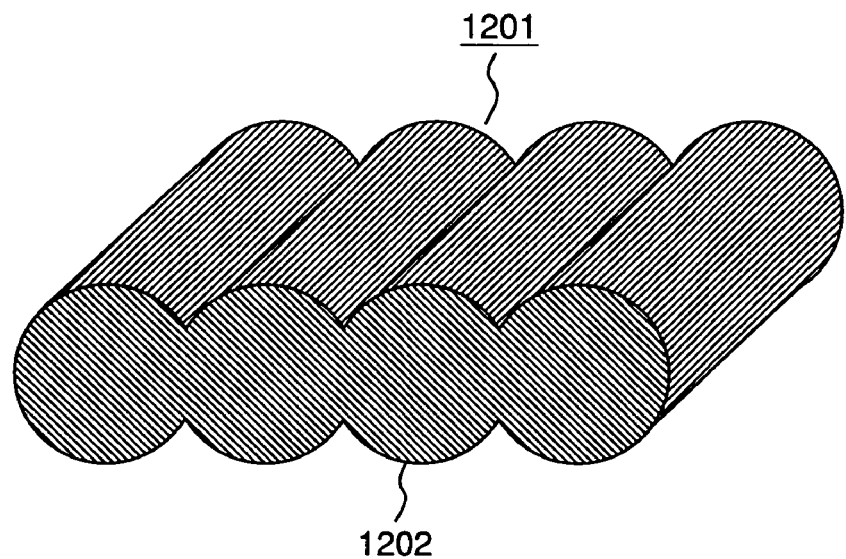
FIG. 13 shows an oblique view of the brief construction of the secondary battery pack in FIG. 12.

FIG. 12 is a horizontal cross-sectional view of another embodiment of the secondary battery pack according to the present invention, and FIG. 13 is its oblique view. The secondary battery cells 603 to 606 are molded into a secondary battery pack 1201, using high-radiation insulation resin 1202. The hatched area in the figure represents the insulation resin 1202. While the battery pack shown in FIG. 6 is formed into a rectangular parallelepiped pack using multiple battery cells 601 and 602, the secondary pack 1201 in this embodiment is formed into a pack using high-radiation insulation resin 1202 along with multiple battery cells 603 to 606, and is mounted in contact with the side wall 415 of the metal case of the backup power supply. In order to efficiently radiate the heat generated in charging and discharging the nickel-metal hydride battery, it is molded using resin 1202, having the heat conductivity of more than 10 W/m·k and volume resistivity of more than 10e16 Ωcm and hence enabling high heat radiation and insulation to coexist. As a result of molding cylindrical battery cells 603 to 606, gaps are formed on both sides of the battery pack 1201 as shown in the figure. By utilizing these gaps as ventilation path, heat radiation of the battery pack 1201 can be enhanced. As can be understood from FIG. 13, although the battery section is entirely covered with insulation resin 1202, openings for leading out the power line and sensing line can be provided at any position as described in FIG. 6.

Figure 14:
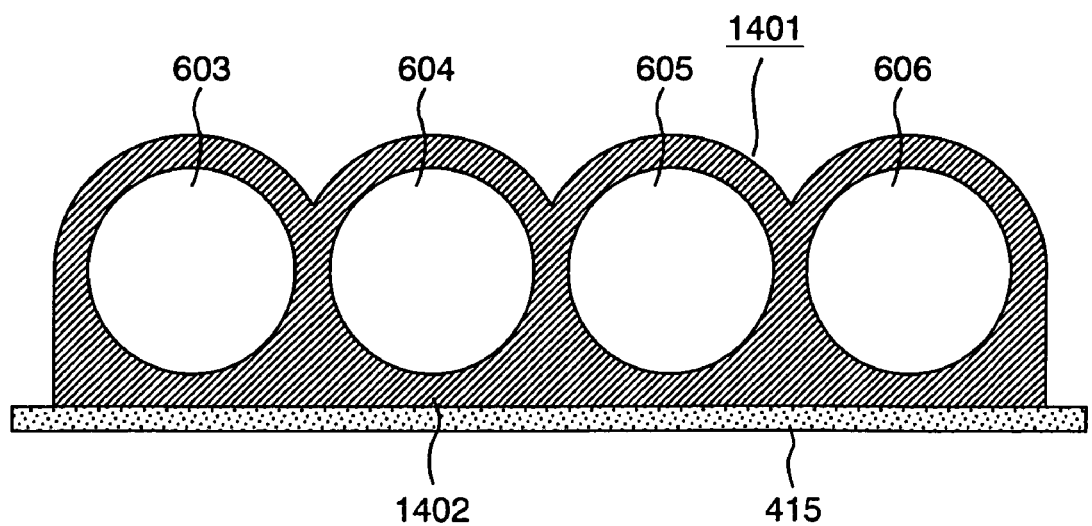
FIG. 14 shows a horizontal cross-sectional view of the secondary battery pack according to another embodiment of the present invention.
Figure 15:
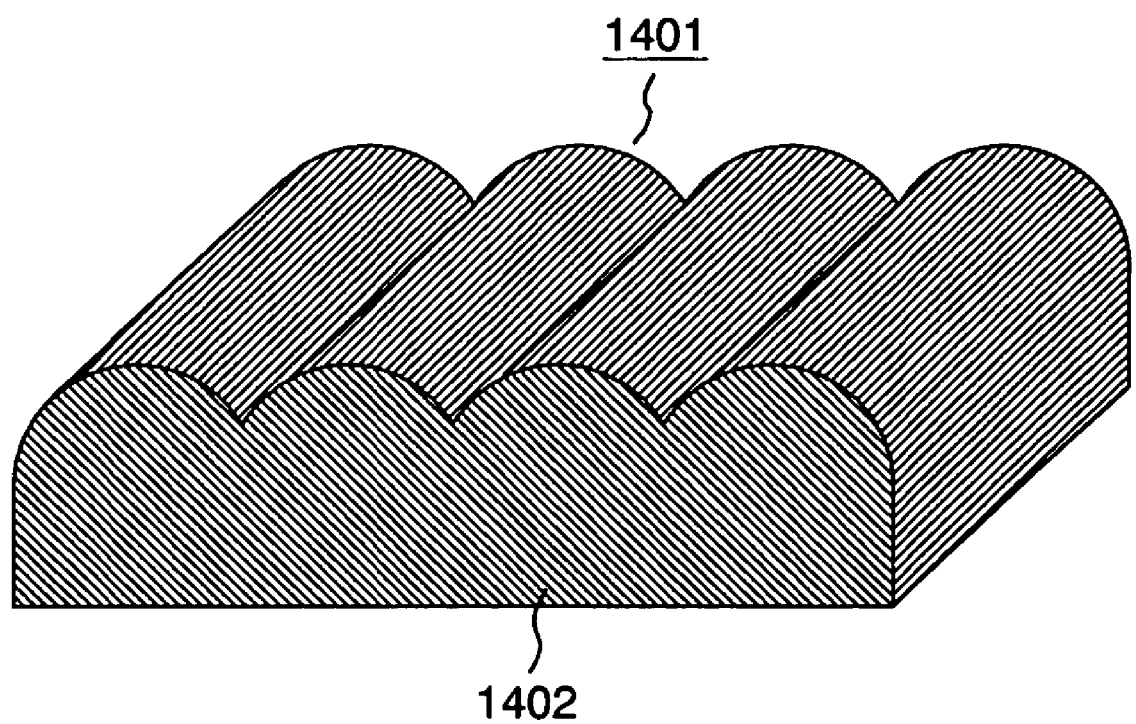
FIG. 15 shows an oblique view of the brief construction of the secondary battery pack in FIG. 14.

FIG. 14 is a horizontal cross-sectional view of another embodiment of the secondary battery pack according to the present invention, and FIG. 15 is its oblique view. Similarly in FIG. 12, the secondary battery cells 603 to 606 are molded into a secondary battery pack 1401, using high-radiation insulation resin 1402. The hatched area in the figure represents the insulation resin 1402. Multiple battery cells 603 to 606 are molded into a pack as shown in the figure, using high-radiation insulation resin 1402, and the pack is mounted in contact with the side wall 415 of the metal case of the backup power supply. In order to allow a wider contact area between the side wall of the battery pack and the wall 415 of the metal case of the backup power supply, it is formed into a semi-cylindrical shape. With this construction, the gaps on one side of the battery pack 1401 are not lost but can be utilized as ventilation path and the other side can utilize the wall 415 of the metal case as heat sink, thereby allowing increased heat radiation. Also in this embodiment, openings for leading out the power line and sensing line can be provided at any position.

What is claimed is:

1. A data processing unit comprising:
    a rack separated vertically into multiple storage sections by partitions;
    a DC backup power supply including a secondary battery section and a charging/discharging control section stored in the bottom storage section of the rack;
    a data processor section equipped with a hard disk drive stored in a higher storage section than the DC backup power supply;
    a primary fan for ventilation from the bottom to the top, mounted in a higher storage section than the bottom section;
    vents formed in the partition closest to the bottom storage section storing the DC backup power supply; and
    wherein the secondary battery section is provided with a rectangular parallelepiped battery pack containing multiple secondary batteries and the battery pack is mounted upright so that the shortest sides of the rectangular parallelepiped are positioned at the top and bottom,
    wherein the primary fan is mounted in the top storage section of the rack and there is also provided an AC/DC converter converting the alternating current from a commercial power source to direct current mounted in a storage section above the bottom storage section and a secondary fan for the ventilation from the bottom to the top mounted adjacent to the AC/DC converter and powered by the AC/DC converter, wherein power is supplied from the AC/DC converter to the primary and secondary fans when the commercial power source is alive and power is supplied only to the primary fan from the DC backup power supply when the commercial power source has failed.

2. A data processing unit according to claim 1, wherein the DC backup power supply comprises a case containing the secondary battery section and charging/discharging control section and vents formed in the top surface and bottom surface of the case.

3. A data processing unit according to claim 1, wherein a circuit board containing the circuit components of the charging/discharging control section of the DC backup power supply is mounted nearly upright.

4. A data processing unit according to claim 1, wherein the primary fan is mounted at a higher position than the data processor section.

5. A data processing unit according to claim 1, wherein there is provided a secondary fan for the ventilation from the bottom to the top mounted above the partition closest to the bottom storage section storing the DC backup power supply.

6. A data processing unit according to claim 1, wherein the DC backup power supply equipped with an AC/DC converter connected with commercial power source comprises the first backup means that connects the DC power line between the AC/DC converter and load devices in the rack with the DC backup power supply and the second backup means that connects specific load devices with the DC backup power supply.

7. A data processing unit according to claim 1, wherein there are provided an external interface board containing indication LEDs and switches mounted on the front of the DC backup power supply, control board containing the charging/discharging control section mounted behind the DC backup power supply, and flat cable connecting the interface board and control board laid alongside a battery pack containing multiple nickel-metal hydride battery cells.

8. A data processing unit according to claim 1, wherein the secondary battery section is provided with a battery pack containing multiple molded secondary batteries.

9. A data processing unit according to claim 1, wherein the secondary battery section is provided with a battery pack containing multiple molded secondary batteries, of which molding material is resin having the thermal conductivity of more than 10 W/m·k and volume resistivity of more than 10e16 Ωcm.

10. A data processing unit according to claim 1, wherein the secondary battery section is made of multiple molded secondary batteries, of which molding resin gets in contact with a metal case surface.

* * * * *